United States Patent
Tyagi et al.

(10) Patent No.: US 9,307,040 B2
(45) Date of Patent: Apr. 5, 2016

(54) BOUNDARY-LESS M2M SERVICE LAYER

(71) Applicant: Verizon Patent and Licensing Inc., Arlington, VA (US)

(72) Inventors: Rajesh Tyagi, Ayer, MA (US); Mimi K Tam, Brookline, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 390 days.

(21) Appl. No.: 13/733,459

(22) Filed: Jan. 3, 2013

(65) Prior Publication Data

US 2014/0189001 A1  Jul. 3, 2014

(51) Int. Cl.
*G06F 15/16* (2006.01)
*H04L 29/08* (2006.01)

(52) U.S. Cl.
CPC ............................ *H04L 67/2809* (2013.01)

(58) Field of Classification Search
CPC .................................................. H04L 67/2809

USPC ........................................................ 709/204
See application file for complete search history.

(56) References Cited

U.S. PATENT DOCUMENTS

2012/0170451 A1*  7/2012  Viswanathan et al. ........ 370/230
2013/0017827 A1*  1/2013  Muhanna et al. .......... 455/426.1

OTHER PUBLICATIONS

ETSI TS 102 689 v1.1.1, Aug. 2011, Machine-to-Machine communications (M2M); M2M service requirements.*

* cited by examiner

*Primary Examiner* — Hee Soo Kim

(57) ABSTRACT

A system may include a boundary-less machine-to-machine ("M2M") service layer, which may reside between an application layer and a core network layer. The boundary-less M2M service layer may allow M2M applications to interact with multiple applications (e.g., multiple M2M applications, multiple non-M2M applications, or a mix of both). The boundary-less M2M service layer may also allow M2M devices and applications to interact over various types of networks, such as wireless and wireline networks.

20 Claims, 13 Drawing Sheets

BOUNDARY-LESS M2M SERVICE LAYER

BACKGROUND

Machine to machine ("M2M") technologies may refer to computing devices that transmit information, such as sensed information (e.g., temperature values, inventory levels, etc.) to other computing devices, which may act on the information. M2M technologies typically use a sensor or meter to capture the raw data. The raw data may be relayed through a network to an application (e.g., a software program), that translates the raw data into meaningful information (e.g., a temperature spike, items need to be restocked, etc.).

DETAILED DESCRIPTION OF PREFERRED EMBODIMENTS

The following detailed description refers to the accompanying drawings. The same reference numbers in different drawings may identify the same or similar elements.

Figure 1:
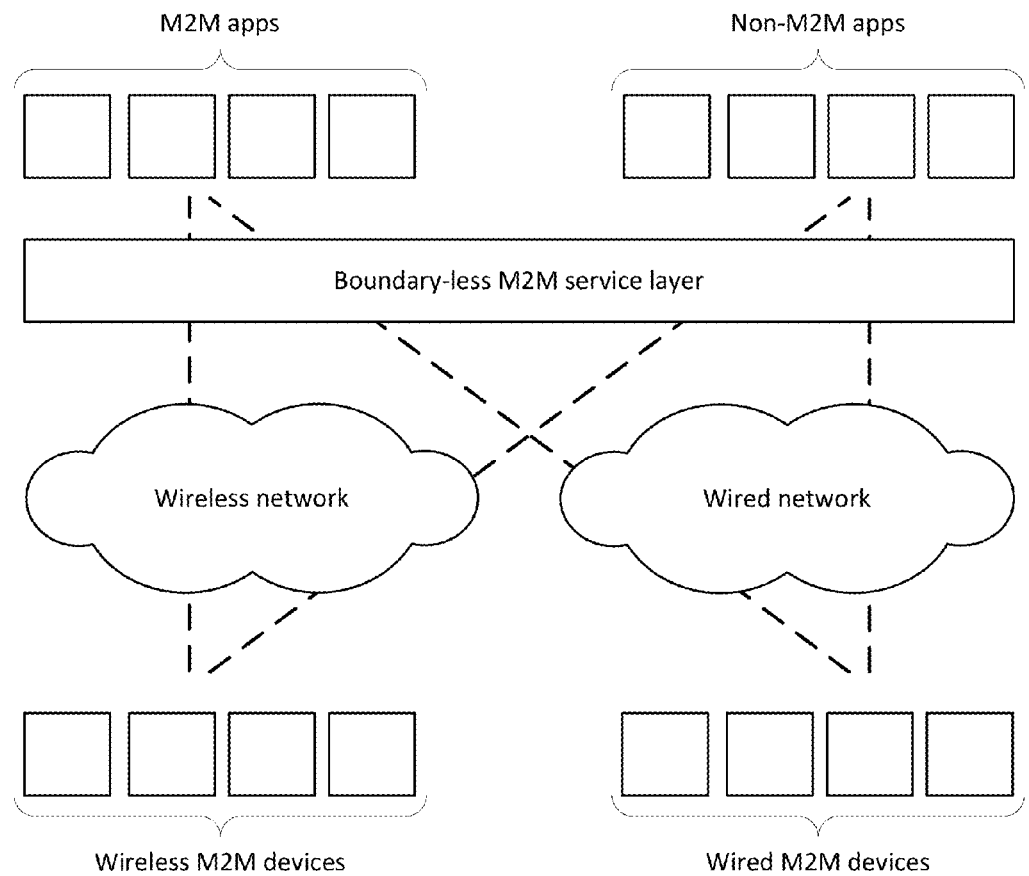
FIG. 1 illustrates an overview of one or more example implementations described herein.

A system and/or method, described herein, may provide a boundary-less machine-to-machine ("M2M") service layer ("BMSL"), which may allow M2M applications and devices to interact with any type of application (such as non-M2M applications and/or other M2M applications) via any type of network (such as wireless and/or wireline networks). For example, as shown in FIG. 1, a BMSL may act as an interface between a set of networks (e.g., a wireless network and a wired network) and a set of applications (e.g., a set of M2M applications and a set of non-M2M applications). In some implementations, the BMSL may allow an M2M application to interact with multiple other M2M and/or non-M2M applications within a single session (e.g., within a single Packet Data Protocol ("PDP") context).

The BMSL may act as a single point of control for M2M applications, session-oriented communications, and/or session-less communications. By acting as a single point of control, the BMSL may allow a high level of configurability for an administrator of the BMSL. Additionally, since the BMSL may act as a single point of control, the BMSL may provide the opportunity for more simplified billing of users of applications or services. Since the BMSL may act as a single point of control, the BMSL may allow for the collection of statistics, based on which service providers may make business decisions (e.g., decisions regarding subscription rates, network infrastructure, advertising, etc.).

Furthermore, in some implementations, the BMSL may allow M2M devices to communicate with applications and/or other devices via any type of access network (e.g., wireless access networks and/or wired access networks) and/or core network (e.g., core networks that include an Internet Protocol Multimedia Subsystem ("IMS") and/or core networks that do not include an IMS). In this sense, the BMSL may be viewed as an abstraction layer between a core network and applications that communicate with M2M devices.

The BMSL of some implementations may enforce quality of service ("QoS") and/or other policies that are associated with one or more associated networks (e.g., one or more core networks via which the BMSL facilitates communications between M2M devices and applications). In some implementations, the BMSL may enforce application interaction rules (e.g., conditions under which communications associated with one application may interrupt communications associated with another application). In some implementations, the BMSL may provide load balancing services for applications (e.g., may throttle and/or redistribute requests for particular applications based on load associated with the applications).

Based on at least some of the advantages mentioned above, the BMSL may provide a framework for real-time integration with multi-vendor applications to existing core network infrastructures, which may allow service providers to provide enhanced functionality without significant cost. This may enable new business models for service delivery, and provide the ability for fast customization of services.

Figure 2A:
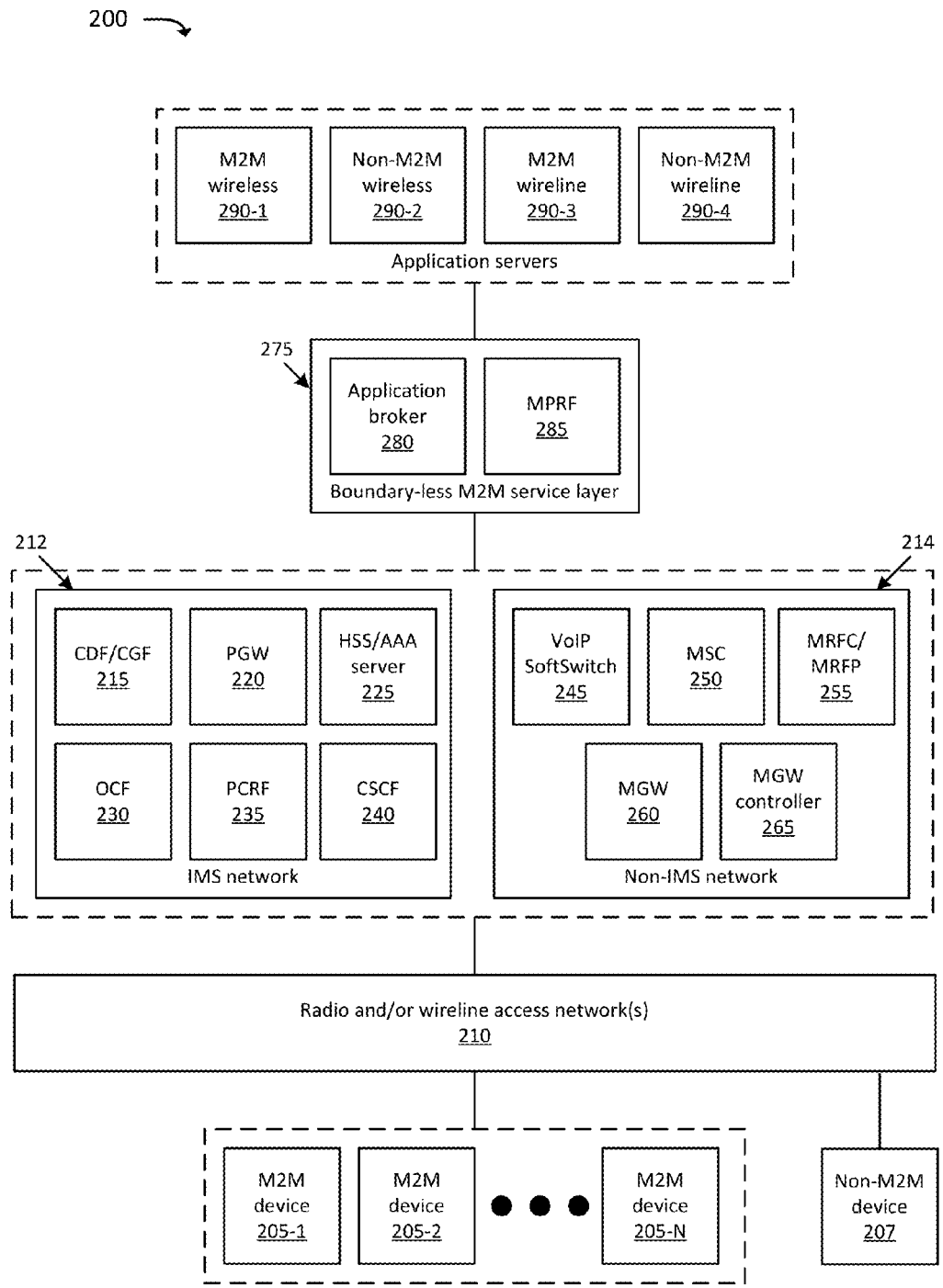
FIG. 2A illustrates an example environment in which systems and/or methods, described herein, may be implemented.

FIG. 2A illustrates an example environment 200, in which systems and/or methods described herein may be implemented. As shown in FIG. 2A, environment 200 may include M2M devices 205-1 through 205-N (hereinafter referred to collectively as "M2M devices 205," or individually as "M2M device 205;" where N is an integer greater than or equal to two), access networks 210, a set of core networks (e.g., IMS network 212 and non-IMS network 214), BMSL 275, and application servers 290-1 through 290-4 (hereinafter referred to collectively as "application servers 290," or individually as "application server 290").

The quantity of devices and/or networks, illustrated in FIG. 2A, is provided for explanatory purposes only. In practice, there may be additional devices and/or networks; fewer devices and/or networks; different devices and/or networks; or differently arranged devices and/or networks than illustrated in FIG. 2A. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

M2M device 205 may include a computation and communication device, which may collect and output data. For example, M2M device 205 may include a microphone, a video camera, a heartbeat monitor, a thermometer, a speed sensor, and/or another type of data collection device. M2M device 205 may send traffic to and/or receive traffic from application servers 290 via a particular access network 210 (wirelessly and/or in a wired manner), a core network, and/or BMSL 275. M2M device 205 may be designed and/or programmed to communicate with application servers 290 using a specific set of communication protocols that are designated for M2M devices (e.g., a BiTXml™ protocol, a M2MXML protocol, and/or another protocol).

In some implementations, M2M device 205, as used herein, may refer to a non-M2M device (e.g., a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device) that is communicatively coupled to a M2M gateway device. Together, a non-M2M device and a M2M gateway device may act as an M2M device. That is, a M2M gateway may translate communications sent from a non-M2M device (e.g., a device that does not communicate using M2M communication protocols) to communications according to a M2M protocol.

Non-M2M device 207 may include a computation and communication device. For example, non-M2M device 207 may include a radiotelephone; a PCS terminal (e.g., a device that combines a cellular radiotelephone with data processing and data communications capabilities); a PDA (e.g., that can include a radiotelephone, a pager, Internet/intranet access, etc.); a smart phone; a laptop computer; a tablet computer; a camera; a personal gaming system, or another type of mobile computation and communication device.

Access network(s) 210 may include one or more radio access networks ("RANs") and/or one or more wireline access networks. A RAN may include, for example, a set of devices that send and/or receive data to and/or from M2M device 205 in a wireless fashion. A particular RAN may include a Long Term Evolution ("LTE") and/or an Evolved Packet Core ("EPC") network that operates on a third generation partnership project ("3GPP") wireless communication standard. Such a RAN may include, for example, a set of base stations (which may, in some implementations, take the form of an evolved node B ("eNB")), a mobile management entity ("MME"), and a serving gateway ("SGW").

An MME may, for example, perform operations to register M2M device 205, to establish bearer channels associated with a session with M2M device 205, and/or to handoff M2M 205 to/from one network from/to another network. The MME may perform policing operations on traffic destined for and/or received from M2M device 205. An SGW may, for example, aggregate traffic received from one or more base stations, and may send the aggregated traffic to a core network (e.g., IMS network 212 and/or non-IMS network 214).

As mentioned above, access network(s) 210 may also include a wireline access network. A wireline access network may include, for example, a Public Switched Telephone Network ("PSTN"), an IP network, a Packet Data Network ("PDN"), a digital subscriber line ("DSL") network, an Integrated Services Digital Network ("ISDN"), and/or another wired access network, via which M2M device 205 may communicate with a core network.

A core network may provide various services to subscribers, such as routing voice and data to and/or from M2M devices 205. IMS network 212 may include Charging Data Function/Charging Gateway Function ("CDF/CGF") 215, PDN Gateway ("PGW") 220, Home subscriber server/authentication, authorization, accounting server ("HSS/AAA server") 225, Online Charging Function ("OCF") 230, Policy Charging and Rules Function ("PCRF") 235, and Call Session Control Function ("CSCF") 240.

CDF/CGF 215 may include one or more devices that receive information regarding charging events (e.g., call sessions, data transferred, and/or other events), and may generate charging data records ("CDRs") based on these charging events. CDF/CGF 215 may store and/or route CDRs for further processing (e.g., may output CDRs to a billing system).

PGW 220 may include one or more devices that aggregate traffic received from one or more access networks 210 (e.g., traffic received from one or more SGWs). PGW 220 may send the aggregated traffic to an external network (e.g., to a PDN, such as the Internet). PGW 220 may also, or alternatively, receive traffic from an external network, and may send the traffic toward M2M device 205 via access network 210.

HSS/AAA server 225 may include one or more devices that manage, update, and/or store profile information associated with subscribers. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may, for example, be associated with a particular M2M device 205. Additionally, or alternatively, HSS/AAA server 225 may perform authentication, authorization, and/or accounting operations associated with the subscriber and/or a communication session with M2M device 205. OCF 230 may include one or more devices that calculate a quantity of non-monetary units (e.g., service units, data volume, time and events) that should be assigned prior to starting delivery of a service.

PCRF 235 may include one or more devices that store information regarding policies and/or subscriptions from one or more sources, such as subscriber databases and/or from one or more users (such as, for example, an administrator associated with PCRF 235). PCRF 235 may store information regarding policies relating to subscriber QoS, applications, routing management, and traffic engineering. The information (e.g., policies) stored in PCRF 235 may, in some situations, be modified by an administrator associated with PCRF 235, such as a service provider.

CSCF 240 may include one or more devices that process Session Initiation Protocol ("SIP") packets in IMS network 212. CSCF 240 may serve as the entry and/or exit point for traffic that is transmitted between IMS network 212 and M2M device 205. CSCF 240 may provide services such as subscriber authentication, policy control, bandwidth management, charging, and/or other services.

Non-IMS network 214 (hereinafter referred to as "network 214") may include, for example, Voice over IP ("VoIP") Soft-Switch 245, Mobile Switching Center ("MSC") 250, Media Resource Function Controller/Media Resource Function Processor ("MRFC/MRFP") 255, Media Gateway ("MGW") 260, and MGW controller 265. VoIP SoftSwitch 245 may include one or more devices that route VoIP calls to and/or from one or more devices (e.g., VoIP telephones, VoIP-enabled smartphones, etc.).

MSC 250 may include one or more devices that set up and release end-to-end connections, handle mobility and/or handover requirements during calls, process charging events, and/or monitor pre-paid accounts in real time. In some implementations, MSC 250 may serve as the primary service delivery node for Global System for Mobile ("GSM") and/or Code Division Multiple Access ("CDMA") networks. MRFC/MRFP 255 may include one or more devices that provide media-related functions, such as media manipulation (e.g., voice stream mixing), playing of tones and announcements.

MGW 260 may include one or more devices that convert digital media streams between different telecommunication networks. For example, MGW 260 may implement a VoIP MGW, which may convert time-division multiplexing ("TDM") voice signals to a media streaming protocol, such as Real-time Transport Protocol ("RTP"). MGW controller 265 may include one or more devices that receive signaling information (e.g., dialed phone number digits), and may control MGW 260 based on the signaling information (e.g., instruct MGW 260 to alert a called party).

BMSL 275 may include one or more devices that allow M2M applications to interact with any type of application (e.g., other M2M applications and/or non-M2M applications), and may further allow M2M devices 205 to interact with applications via any type of access network (e.g., via a RAN or a wireline network). BMSL 275 may include, for example, application broker 280 and M2M Policy and Rules Function ("MPRF") 285.

Application broker 280 may include one or more devices that allow communication between multiple M2M applications, and between M2M and non-M2M applications. For example, application broker 280 may implement a BMSL application programming interface ("API"), which may handle functions, invoked by M2M applications according to the BMSL API. For instance, the BMSL API may allow a particular M2M application to request that a voice call be made with certain parameters (e.g., a phone number to be dialed, a message to be played, etc.). In such a situation, the M2M application may send a request to application broker 280 that a voice call be made, along with the parameters. Based on this request (and possibly other factors, such as policies and/or rules), application broker 280 may cause the voice call to be made (e.g., via a non-M2M VoIP application) according to the parameters.

As another example, the BMSL API may allow M2M applications to communicate with each other. For instance, the BMSL API may include an interface function, which allows an M2M application to send data to another M2M application, and causes the other M2M application to receive the data (e.g., to "listen" for the data). For instance, assume that a temperature monitoring M2M application receives information regarding a temperature of a house from a particular M2M device 205 (e.g., a M2M device that includes a thermometer). When the temperature reaches a certain level, the temperature monitoring M2M application may send a message to application broker 280. This message may be addressed to another application, such as a mobile personal emergency response system ("mPERS") application, indicating that the temperature has reached the certain level. While the mPERS application may traditionally be a M2M application (e.g., an application that is designed to receive and interpret data received from M2M devices 205), the mPERS application according to some implementations may be able to receive and interpret data from other applications (e.g., the temperature monitoring M2M application), via the interface provided by the BMSL API.

In some implementations, application broker 280 may perform access control for multiple applications. For example, assume that multiple communications are received during a single session (e.g., during a phone call). For instance, continuing with the above example, assume that the mPERS causes a voice call to be made to a particular user (e.g., a subscriber associated with M2M device 205), based on the temperature reaching the certain level. Further assume that the particular user is already on a voice call. Application broker 280 may determine (e.g., based on a set of policies and/or rules, as described below with respect to MPRF 285) whether to interrupt the user's voice call in order to provide the user with information regarding the temperature.

In some implementations, application broker 280 may handle application communications in a particular order, based on, for example, the type of communication received, the identity of an application from which the communication was received, etc. For instance, as described below with respect to, for example, FIGS. 4A-4C, application broker 280 may await the output of one application before invoking another application during the same session. In this sense, application broker 280 may use the output of one application as input for another application.

Application broker 280, of some implementations, may assist in enforcing a set of policies associated with communications to and/or from M2M devices 205 and/or application servers 290. For instance, application broker 280 may provide information to PCRF 235 regarding communications sent to and/or received from IMS network 212, based on which IMS network 212 may enforce a particular QoS. In this sense, even over different networks (e.g., different core networks and/or different access networks), application broker 280 may provide network functionality for which various applications are designed (e.g., applications that are designed for wireless and/or wireline networks). For example, a particular M2M application may be designed with a particular QoS requirement, which may be typically associated with a wireline access network. In some implementations, application broker 280 may allow a particular M2M device 205 to communicate with the M2M application via a wireless access network by causing the particular QoS requirement to be enforced by the wireless access network.

MPRF 285 may store conditions and policies, based on which application broker 280 may perform some or all of the functionality described above. For example, MPRF 280 may store identification information regarding M2M applications, identification and/or subscriber information associated with M2M devices 205, QoS information (e.g., bandwidth or latency requirements, delivery guarantees, access technology, delivery delay tolerance, etc.), M2M access network type, M2M acquisition point driver, M2M application access modem mapping policies, and/or other types of policies and/or rules related to M2M devices 205 or applications.

MPRF 285 may receive the information regarding conditions and policies from one or more other devices, such as from a network device associated with a core network. For instance, in some implementations, MPRF 285 may receive information from PCRF 235 of IMS network 212. Additionally, or alternatively, MPRF 280 may receive information from an administrator associated with MPRF 285 (e.g., a service provider associated with BMSL 275).

For instance, referring to an example discussed above (in which a particular M2M application requests that a voice call be made to a particular phone number), MPRF 285 may provide the particular phone number to application broker 280. Based on whether the policies and/or rules stored by MPRF 285 specify to do so, MPRF 285 may additionally provide other information (e.g., information that was not specifically requested to be sent by a particular M2M application, such as a name and/or a telephone number of a subscriber associated with M2M device 205).

Referring to another example discussed above (in which application broker 280 uses the output of one application as input for another application), MPRF 285 may store information identifying a manner in which to handle outputs and inputs of particular applications. For instance, MPRF 285 may store information identifying that when a particular type of communication is received from a M2M application (e.g., a request for a voice call to be made), actions taken based on the communication should be based on additional information (e.g., the request for the voice call should additionally include subscriber information, such as name and telephone number).

As further shown in FIG. 2A, environment 200 may include a set of application servers 290. Application servers 290 may include, for example, M2M wireless application server 290-1, non-M2M wireless application server 290-2, M2M wireline application server 290-3, and non-M2M wireline application server 290-4. Although shown in this figure as a set of application servers (e.g., a set of server devices), one or more of application servers 290 may be implemented as a virtual device (e.g., as software running on a set of physical devices). Furthermore, in some implementations, multiple application servers 290 may be implemented within a single server device, while in some implementations, a single application server 290 may be implemented across multiple server devices. Additionally, environment 200 may include fewer application servers 290, more application servers 290, different application servers 290, and/or differently arranged application servers 290. For example, in some implementations, environment 200 may include multiple M2M wireless application servers 290-1, no non-M2M wireless application servers 290-2, etc.

M2M wireless application server 290-1 may execute one or more applications (as implemented in software and/or hardware), which are designed to interact with M2M devices 205 via a wireless access network (e.g., may be designed to send and/or receive communications by using one or more wireless protocols, and/or may be designed with a particular QoS requirement). Some such applications may include, for example, a telematics M2M application (e.g., an application that receives and processes information from M2M devices that collect telemetry information, such as telemetry information associated with vehicles), a healthcare application (e.g., an application that receives and processes information from M2M devices that collect health-related information, such as heartbeat information, blood sugar information, blood pressure information, etc.), or a home security M2M application (e.g., an application that receives and processes information from M2M devices that collect home security information, such as video monitoring information, security system information, etc.).

One or more M2M applications, associated with application server 290-1, may be designed according to a BMSL API of some implementations. That is, a particular M2M application, associated with application server 290-1, may be capable of communicating with other applications (e.g., other M2M applications or non-M2M applications). For example, the BMSL API may provide a function, which may be invoked by the particular M2M application, which may allow the particular M2M application to output data. In some implementations, the BMSL API may allow the particular M2M application to specify a recipient application (e.g., identify by an application identifier). In some implementations, BMSL 275 (e.g., application broker 280) may identify a recipient application based on policies and/or rules (e.g., as stored by MPRF 285).

Non-M2M wireless application server 290-2 may execute one or more applications (as implemented in software and/or hardware), which are not necessarily designed to interact with M2M devices (e.g., smartphones, tablet computers, or the like) via a wireless access network (e.g., may be designed to send and/or receive communications by using one or more wireless protocols, and/or may be designed with a particular QoS requirement). Such applications may include, for example, a voice call application (such as a VoIP application), a videoconferencing application, a file transfer application, etc.

One or more non-M2M applications, associated with application server 290-2, may be designed according to a BMSL API of some implementations. That is, a particular non-M2M application, associated with application server 290-1, may be capable of communicating with other applications (e.g., other M2M applications or non-M2M applications). For example, the BMSL API may provide a function, which may be invoked by the particular non-M2M application, which may allow the particular non-M2M application to output data. In some implementations, the BMSL API may provide an interface (e.g., a logical interface), via which the particular non-M2M application may receive information from one or more other applications (e.g., a M2M application that invokes a function, of the BMSL API, through which the M2M application provides information to the non-M2M application).

M2M wireline application server 290-3 may execute one or more applications (as implemented in software and/or hardware), which are designed to interact with M2M devices 205 via a wireline access network (e.g., may be designed to send and/or receive communications by using one or more wireline protocols, and/or may be designed with a particular QoS requirement). One or more M2M applications, associated with application server 290-3, may be designed according to a BMSL API of some implementations. That is, a particular M2M application, associated with application server 290-1, may be capable of communicating with other applications (e.g., other M2M applications or non-M2M applications).

Non-M2M wireline application server 290-4 may execute one or more applications (as implemented in software and/or hardware), which are designed to interact with non-M2M devices (e.g., smartphones, tablet computers, or the like) via a wireline access network (e.g., may be designed to send and/or receive communications by using one or more wireline protocols, and/or may be designed with a particular QoS requirement). One or more non-M2M applications, associated with application server 290-4, may be designed according to a BMSL API of some implementations. That is, a particular non-M2M application, associated with application server 290-4, may be capable of communicating with other applications (e.g., other M2M applications or non-M2M applications). For example, the BMSL API may provide a function, which may be invoked by the particular non-M2M application, which may allow the particular non-M2M application to output data. In some implementations, the BMSL API may provide an interface (e.g., a logical interface), via which the particular non-M2M application may receive information from one or more other applications (e.g., a M2M application that invokes a function, of the BMSL API, through which the M2M application provides information to the non-M2M application).

Figure 2B:
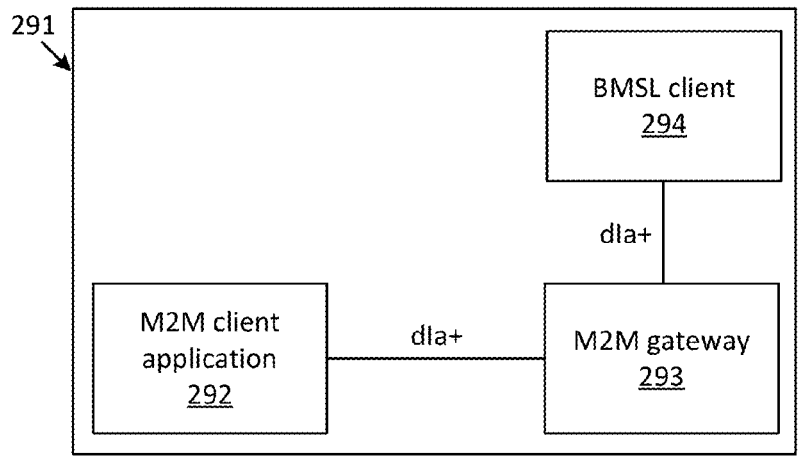
FIGS. 2B-2D illustrate example interfaces between various devices illustrated in FIG. 2A.
Figure 2C:
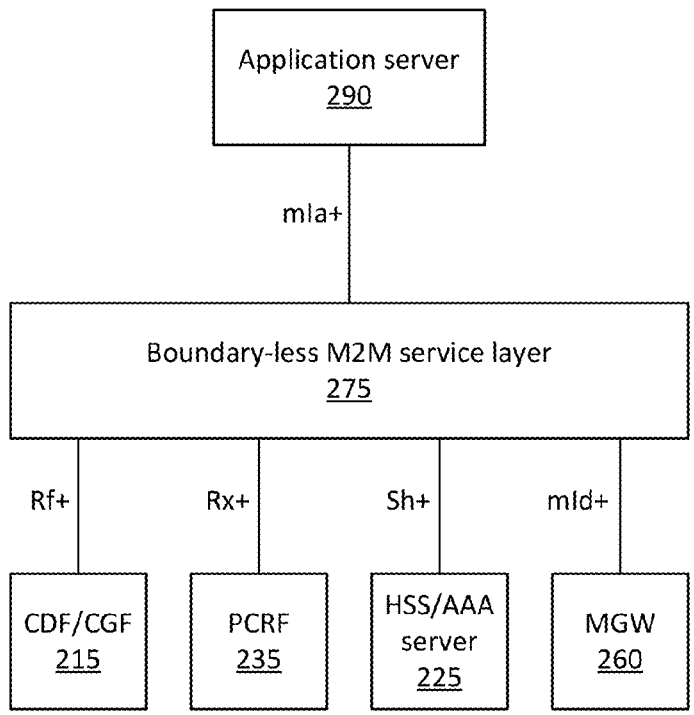
Figure 2D:
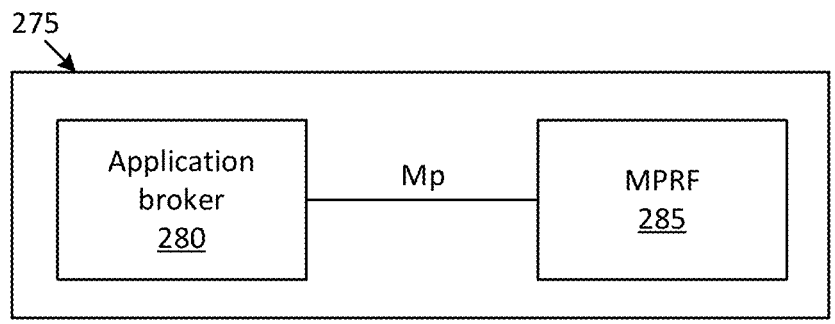

FIGS. 2B-2D illustrate example interfaces (e.g., logical interfaces), through which various devices shown in FIG. 2A may communicate. For example, as shown in FIG. 2B, M2M device 291 may include M2M client application 292, M2M gateway 293, and BMSL client 294. In some implementations, M2M device 291 may correspond to M2M device 205. In some implementations, M2M device 291 may correspond to a non-M2M device (such as a smart phone, a tablet computer, etc.), in which M2M gateway 293 and BMSL client 294 may be implemented as software running on the non-M2M device. In this sense, the non-M2M device may act as a M2M device. In some implementations, M2M device 291 may correspond to a set of devices, such as a non-M2M device, that runs M2M client application 292, and another device that acts as M2M gateway 293 and/or as BMSL client 294.

M2M client application 292 may include, for example, an application (implemented via hardware and/or software) that collects and/or outputs data. For example, M2M client application 292 may receive temperature data from a temperature sensing device associated with M2M device 291, and may output some or all of the received temperature data to M2M application server 290, via M2M gateway 293.

BMSL client 294 may include, for example, an application (implemented via hardware and/or software) that allows M2M device 291 to communicate with a BMSL (e.g., with BMSL 275). In some implementations, BMSL client 294 may receive data from M2M client application 292 (e.g., via M2M gateway 293), and may output the data to BMSL 275. In some implementations, when outputting data to BMSL 275, BMSL client 294 may modify the data, and/or add additional data. For example, in some implementations, when outputting data to BMSL 275, BMSL client 294 may include information such as a device type of M2M device 291 (e.g., information identifying a type of sensor included in M2M device 291, such as a thermometer, a pressure sensor, a video camera, etc.), type of data outputted by M2M device 291 (e.g., temperature data, pressure data, video data, etc.), a device identifier of M2M device 291 (e.g., an International Mobile Subscriber Identity ("IMSI"), an International Mobile Station Equipment Identity ("IMEI"), etc.), authentication information that allows BMSL 275 to authenticate M2M device 291 (e.g., authentication information via which BMSL 275 may accept communications to and/or from M2M device 291), address information associated with BMSL 275 (e.g., a Uniform Resource Locator ("URL"), a Uniform Resource Identifier ("URI"), an IP address, etc.), and/or other information.

In some implementations, M2M client application 292 and/or BMSL client 294 may be dynamic, in that a user of device 291 may replace a particular M2M client application 292 and/or BMSL client 294 with a different respective M2M client application 292 and/or BMSL client 294. For example, a user may purchase M2M device 291, which may initially include M2M gateway 293. The user may download a particular M2M client application 292, which may, for example, dictate the manner in which device 291 collects and/or outputs data (e.g., a collection and/or output interval). The user may also download a particular BMSL client 294, which may be provided by, for example, a service provider associated with BMSL 275.

M2M client application 292 and M2M gateway 293 may communicate via a logical interface, such as a device application interface (e.g., a "dIa" interface, as specified by, for example, the European Telecommunications Standards Institute ("ETSI") M2M technical specification ("TS") 102.921, TS 102.690, and/or TS 102.689). The dIa interface may define a set of communications via which M2M gateway 293 may receive information regarding capabilities of M2M client application 292. In some implementations, M2M client application 292 and M2M gateway 293 may communicate via an enhanced dIa interface (shown in FIG. 2B as "dIa+"). Using dIa+, M2M client application 292 and/or M2M gateway 293 may transmit messages to each other with information beyond a specified dIa standard. In some implementations, M2M gateway 293 may communicate with BMSL client 294 using the dIa+ interface, and in some implementations, M2M device 291 may communicate with BMSL 275 using the dIa+ interface.

As shown in FIG. 2C, CDF/CGF 215 may communicate with BMSL 275 via a logical interface, such as a "Rf+" interface. The Rf+ interface may be based on (e.g., may be an enhanced version of) a Rf interface, as specified by, for example, the 3GPP TS 32.225 and TS 32.299. The Rf interface may facilitate interaction between a Charging Trigger Function ("CTF") and CDF/CGF 215. In some implementations, a Rf+ interface may connect CDF/CGF to BMSL 275 (e.g., to application broker 280) and one or more other devices (e.g., a Network Service Capability Layer ("NSCL") CTF). Using Rf+, CDF/CGF 215 and BMSL 275 may communicate with information beyond a specified Rf standard. For example, the Rf+ interface may include information regarding application brokering events and M2M NSCL data communication events.

As also shown in FIG. 2C, PCRF 235 may communicate with BMSL 275 via a logical interface, such as a "Rx+" interface. For example, PCRF 235 may communicate with application broker 280 and/or MPRF 285 via the Rx+ interface (or, in some implementations, PCRF 235 may communicate with application broker 280 and not MPRF 285 via the Rx+ interface). The Rx+ interface may be based on (e.g., may be an enhanced version of) a Rx interface, as specified by, for example, the 3GPP TS 23.203 and TS 29.214. Via the Rx+ interface, PCRF 235 may output application-level session information, such as IP service data flow ("SDF") filters for policy control and/or charging, bandwidth requirements for QoS, sponsor data (e.g., application ID, usage threshold, event triggers, etc.). Furthermore, via the Rx+ interface, PCRF 235 may provide M2M session-less QoS data bearer setup trigger information and/or other M2M domain-specific parameters to BMSL 275.

As further shown in FIG. 2C, HSS/AAA server 225 may communicate with BMSL 275 via a logical interface, such as a "Sh+" interface. The Sh+ interface may be based on (e.g., may be an enhanced version of a Sh interface, as specified by, for example, the 3GPP TS 29.328 and TS 29.329). Using the Sh+ interface, transparent data, such as service-related information and telecom user-related information (e.g., a Mobile Subscriber Integrated Services Digital Network Number ("MSISDN"), visited network capabilities, serving user cell identifier, address of a serving network element, etc. may be communicated to BMSL 275 by HSS/AAA server 225. In some implementations, using the Sh+ interface, HSS/AAA server 225 may output other information, such as extensions or parameters that can be used by application broker 280 to proxy IMS traffic between a M2M application and a IMS user agent ("UA") associated with M2M Device 205, via a IMS Back to Back User Agent ("B2BUA").

As additionally shown in FIG. 2C, MGW 260 may communicate with BMSL 275 via a logical interface, such as a modified M2M to device ("mId+") interface. The mId+ interface may be based on (e.g., may be an enhanced version of a M2M to device ("mId") interface, as specified by, for example, the ETSI M2M TS 102.921, TS 102.690, and/or TS 102.689). Using mId+, MGW 260 and/or BMSL 275 may transmit messages to each other with information beyond a specified mId standard. For instance, the mId+ interface may allow these devices to communicate information regarding voice and/or video IMS triggers, as well as M2M domain-specific parameters.

As further shown in FIG. 2C, application server 290 may communicate with BMSL 275 via a logical interface, such as a modified M2M application ("mIa+") interface. The mIa+ interface may be based on (e.g., may be an enhanced version of a M2M application ("mIa") interface, as specified by, for example, the ETSI M2M TS 102.921, TS 102.690, and/or TS 102.689). Via the mIa+ interface, application server 290 and BMSL 275 (e.g., application broker 280) may communicate according to a BMSL API—e.g., an API that allows application server 290 to communicate with other application servers 290 via application broker 280. Additionally, or alternatively, via the mIa+ interface, BMSL 275 and application server 290 may communicate information regarding voice and/or video IMS triggers, as well as M2M domain-specific parameters.

As shown in FIG. 2D, application broker 280 and MPRF 285 may communicate via a logical interface, such as an "Mp" interface. Via the Mp interface, application broker 280 may receive, from MPRF 285, rules and/or policy information, such as identification information regarding M2M applications, identification and/or subscriber information associated with M2M devices 205, QoS information (e.g., bandwidth or latency requirements, delivery guarantees, access technology, delivery delay tolerance, etc.), M2M access network type, M2M acquisition point driver, M2M application access modem mapping policies, and/or other types of policies and/or rules related to M2M devices 205 or applications.

Although examples of interfaces are shown in FIGS. 2B-2D, in some implementations, additional, different, fewer, or differently arranged interfaces may be used. For instance, in some implementations, in lieu of a Rx+ interface, PCRF 235 and BMSL 275 may be communicatively coupled via a Rx interface and/or another interface.

Figure 3:
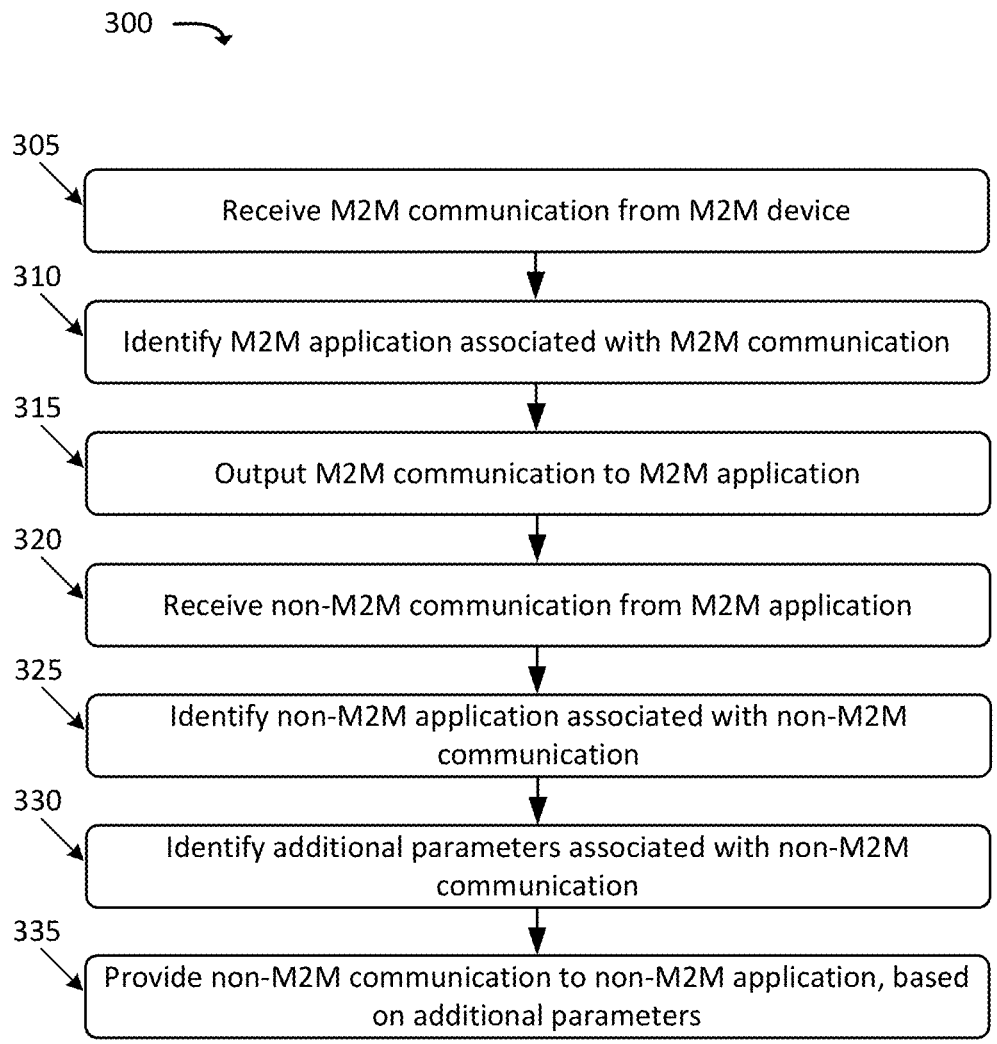
FIG. 3 illustrates an example process for allowing an M2M application to interact with other applications.

FIG. 3 illustrates an example process 300 for allowing an M2M application to interact with other applications. In some implementations, some or all of process 300 may be performed by BMSL 275 (e.g., by application broker 280 and/or MPRF 285). FIG. 3 is described below in connection with examples that refer to FIGS. 2A-2D.

Process 300 may include receiving an M2M communication from an M2M device (block 305). For example, application broker 280 may receive data from M2M device 205. Application broker 280 may receive the data via any type of access network 210 and/or any type of core network (e.g., IMS network 212 or network 214). For example, the data may be received by application broker 280 via a mId+ interface.

Process 300 may also include identifying an M2M application associated with the M2M communication (block 310). For example, application broker 280 may determine, based on the communication, a particular M2M application that is associated with the communication. Application broker 280 may identify the application based on, for example, a set of policies and/or rules stored by, and/or received from, MPRF 285. For instance, MPRF 285 may store information that correlates M2M devices (e.g., by device identifier of M2M device 205) to applications. Additionally, or alternatively, the communication (received at block 305) may include information that identifies the application, associated with the communication.

Process 300 may further include outputting the M2M communication to the identified M2M application (block 315). For example, application broker 280 may output the M2M communication (received at block 305) to a particular application server 290, which is associated with the identified M2M application. As shown in FIG. 2C, application broker 280 may output the M2M communication to application server 290 via a mIa+ interface.

Process 300 may additionally include receiving a non-M2M communication from the M2M application (block 320). For example, application broker 280 may receive a communication from the particular application server 290 via the mIa+ interface, which is intended for a non-M2M application (e.g., a VoIP application).

Process 300 may also include identifying a non-M2M application associated with the non-M2M communication (block 325). For example, application broker 280 may identify the non-M2M application based on a set of policies and/or rules stored by, and/or received from, MPRF 285. For instance, MPRF 285 may store information that correlates applications to each other. In this example, MPRF 285 may store information that correlates the M2M application to a particular non-M2M application (e.g., the information may indicate that information received from the M2M application should be forwarded to the non-M2M application). Additionally, or alternatively, the non-M2M communication may include information identifying the non-M2M application (e.g., an application identifier associated with the non-M2M application).

Additionally, or alternatively, the non-M2M communication may include a request for a particular service (e.g., a voice call service, a video call service, a video conferencing service, a short messaging service ("SMS"), a multimedia messaging service ("MMS"), a file transfer service, a web browsing service, an e-mail service, etc.). Based on this request for the service, application broker 280 may identify a non-M2M application to which the communication should be forwarded (e.g., a non-M2M VoIP application). In some implementations, application broker 280 may make this determination based on information received from MPRF 285. That is, the mIa+ interface may allow an M2M application to request services, and policy information stored by MPRF 285 may indicate how such service requests should be handled (e.g., applications associated with the services, load-balancing rules for distributing the requests for service, etc.).

Process 300 may further include identifying additional parameters associated with the non-M2M communication (block 330). For example, MPRF 285 may store policy and/or rule information indicating additional parameters to include with the non-M2M communication when forwarding the non-M2M communication to a non-M2M application. These parameters may be based on, for example, predetermined arrangements between application vendors and/or service providers.

For example, one particular policy and/or rule may indicate that communications from a particular application should be modified before forwarding the communications to another application (e.g., a subscriber name and/or telephone number should be added before forwarding the communications to another application). As another example, one particular policy and/or rule may indicate that communications to a particular application should be modified before forwarding the communications to the particular application. As yet another example, one particular policy and/or rule may indicate that communications of a certain type (e.g., requests for a voice call to be made) should be modified in a certain way, while communications of another type (e.g., requests for an email to be sent) should be modified a different way and/or unmodified).

Process 300 may additionally include providing the non-M2M communication to the non-M2M application, based on the additional parameters (block 335). For example, application broker 280 may output the non-M2M communication (received at block 325, as potentially modified based on information identified at block 330) to the identified non-M2M application. For instance, application server 290 may output the non-M2M communication to application server 290 via the mIa+ interface.

Figure 4A:
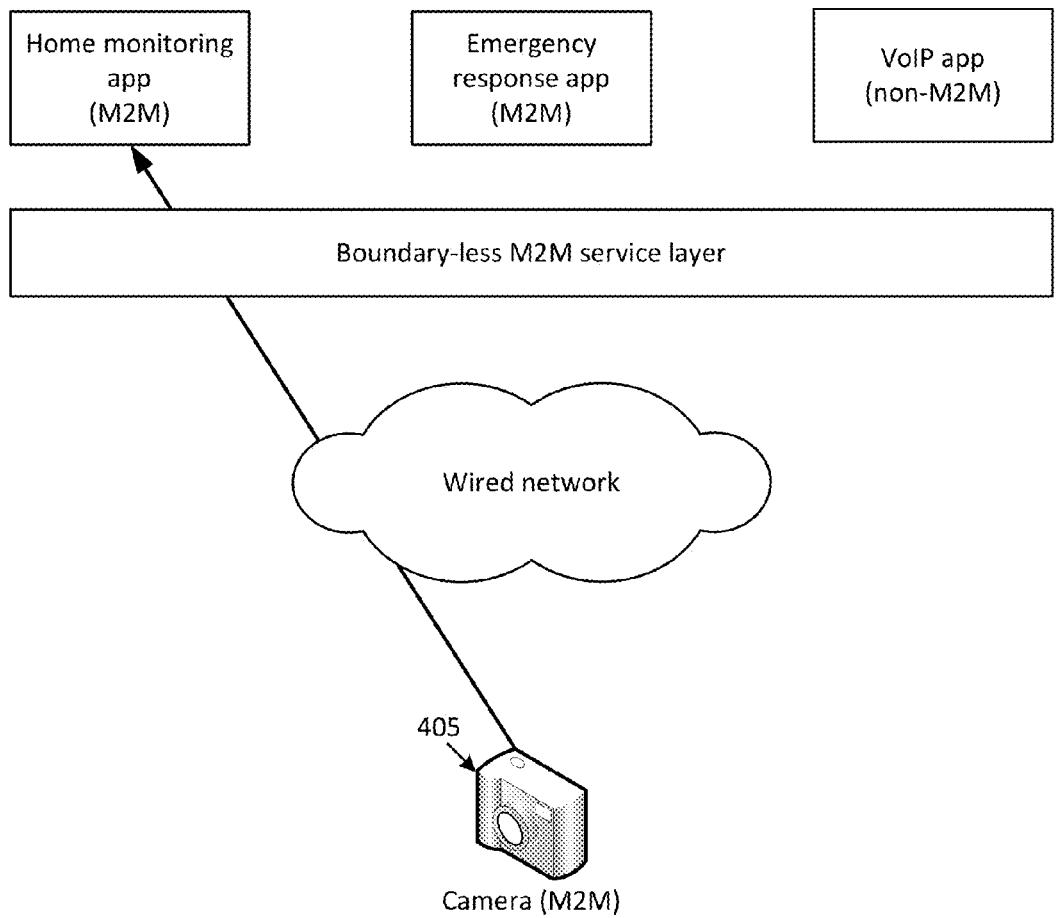
FIGS. 4A-4C illustrate an example of M2M applications interacting with other M2M applications and a non-M2M application.
Figure 4B:
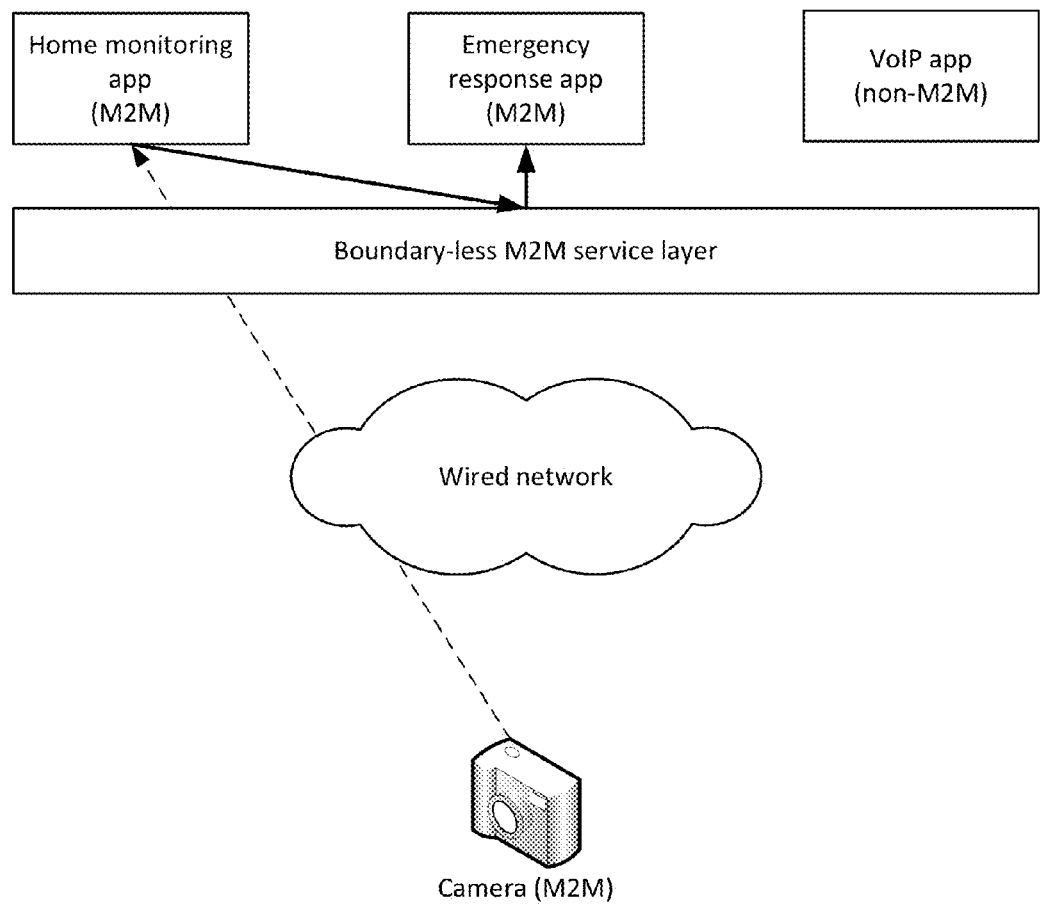
Figure 4C:
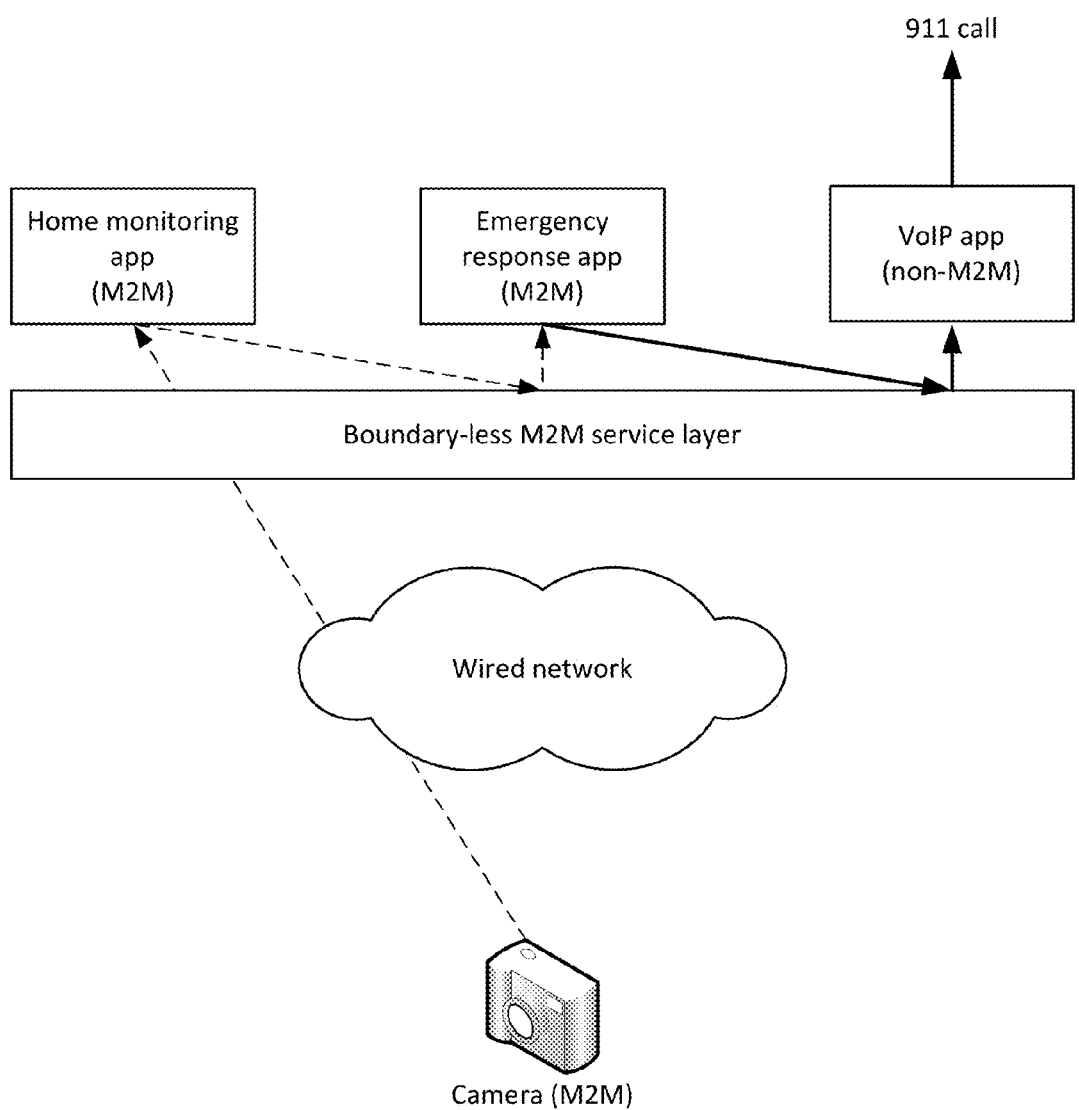

FIGS. 4A-4C illustrate an example of M2M applications interacting with other M2M applications and a non-M2M application. As shown in FIG. 4A, camera 405, which may be an M2M device, may output data to a M2M home monitoring application, via a wireline network and via a BMSL (which may correspond to, for example, BMSL 275). This data may be, for example, streaming video and/or audio data.

The home monitoring application may analyze the received data, and may determine that an event has occurred.

For example, the home monitoring application may determine that a burglar has broken into a home in which camera 405 is located, that a person has fallen down and has not moved for five minutes, or another event. Based on making this determination, and as shown in FIG. 4B, the home monitoring application may send a communication to the BMSL.

For example, assume that the home monitoring application has determined that a person has fallen down and has not moved for five minutes. In this situation, the home monitoring application may send a request for an emergency response. In some implementations, this request may be a request for an emergency response, according to a mIa+ interface, without specifically identifying an application that should handle the emergency response. In some such implementations, the BMSL may determine an appropriate application to handle the request (e.g., an M2M application that handles request for emergency responses). As shown in FIG. 4B, assume that the BMSL identifies a M2M emergency response application to handle the request.

The BMSL may output a communication to the identified M2M emergency response application, based on the communication received from the home monitoring application. In some implementations, the BMSL may add additional information to the communication to the M2M emergency response application, which was not included in the communication from the home monitoring application. For instance, assume that the communication from the home monitoring application did not include a subscriber address associated with camera 405. In some implementations, the BMSL may include the subscriber address in the communication provided to the M2M emergency response application (e.g., based on information received from and/or stored by an MPRF associated with the BMSL).

The M2M emergency response application may receive the communication (e.g., the communication indicating that a person has fallen down and has not moved for five minutes), and may determine a proper response (e.g., place a voice call requesting an ambulance for the subscriber's address). As shown in FIG. 4C, the M2M emergency response application may output a communication to the BMSL. This communication may include, for example, a service request for a voice call, and may include an audio recording to play over the voice call (e.g., an automatically generated audio recording that indicates the type of emergency, the address to send an ambulance, etc.). In some implementations, the communication may include information regarding an emergency telephone number to call (e.g., 9-1-1). Additionally, or alternatively, the BMSL may determine an appropriate emergency telephone number (e.g., based on policies and/or rules stored by an MPRF associated with the BMSL).

Continuing with this example, the BMSL may identify a non-M2M VoIP application, over which the voice call may be made. The BMSL may output a communication to the VoIP application, which may cause the VoIP to initiate a voice call (e.g., a voice call to an emergency telephone number), and to play the automatically generated recording.

In the example shown in FIGS. 4A-4C, the BMSL may process all of the above-described communications within a single session (e.g., within a single PDP context). By processing these communications within a single session, the BMSL may use the output of one application as input for another application. Furthermore, processing these communications within a single session may save time and/or resources that would be expended by implementations which would open multiple sessions.

Figure 5A:
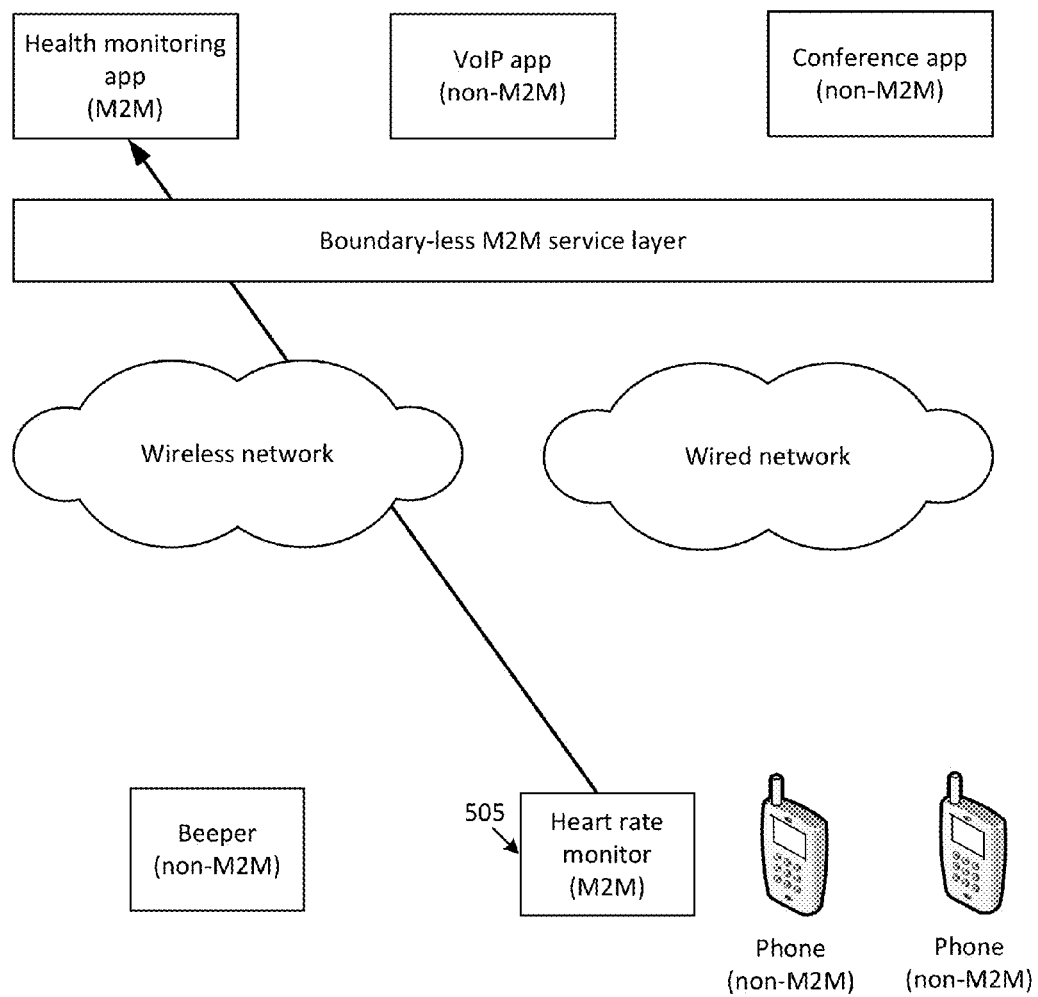
FIGS. 5A-5C illustrate an example of a M2M application interacting with multiple applications within a single session.
Figure 5B:
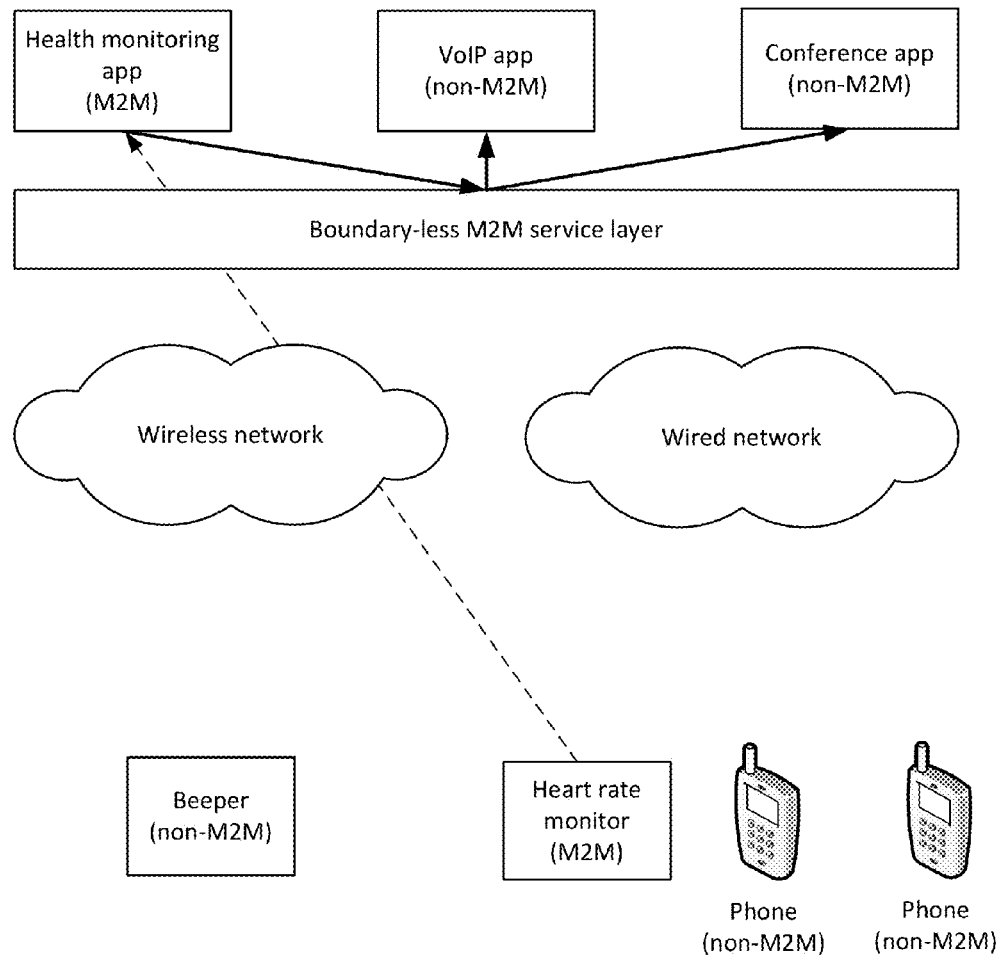
Figure 5C:
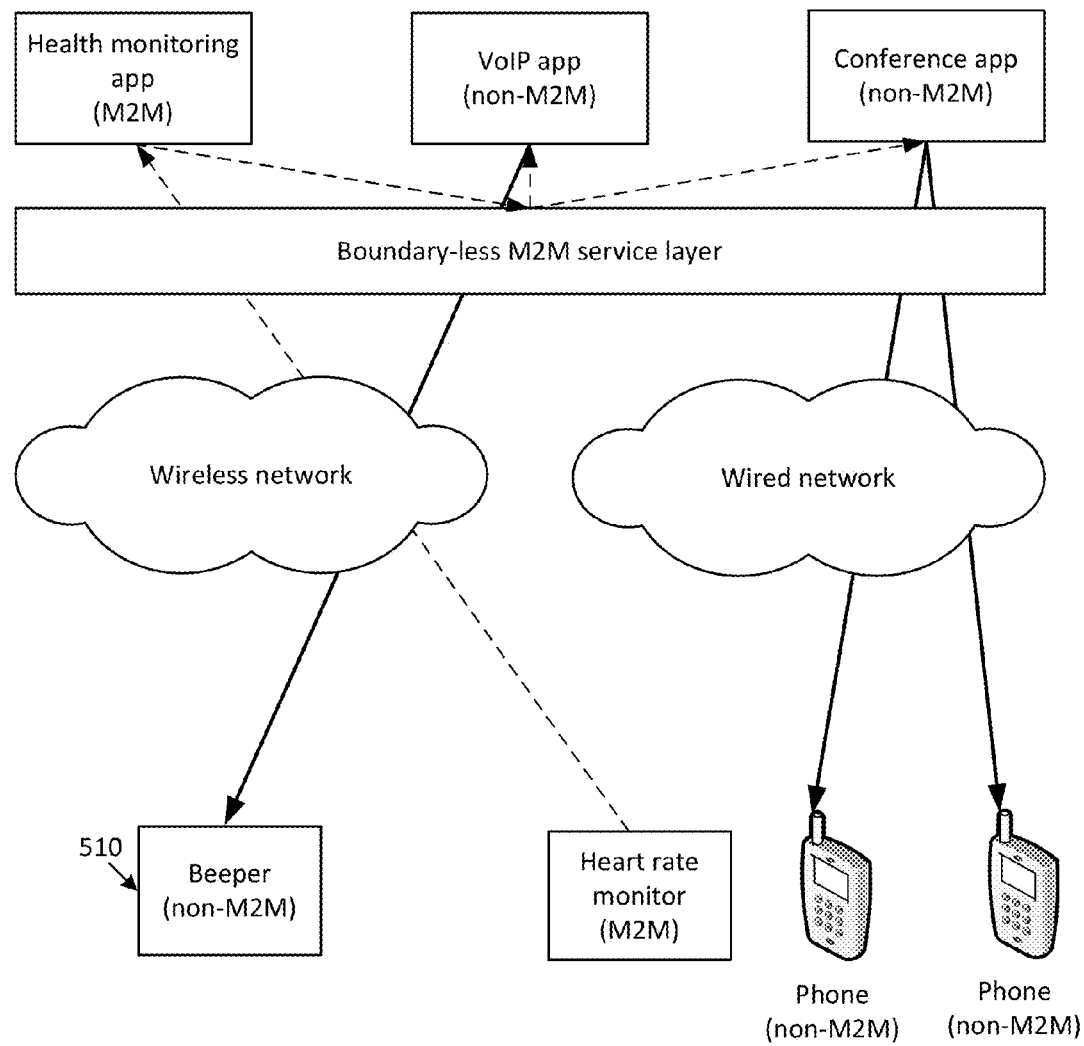

FIGS. 5A-5C illustrate an example of a M2M application interacting with multiple applications within a single session.

For example, as shown in FIG. 5A, heart rate monitor 505, which may be an M2M device, may output data to a M2M health monitoring application, via a wireless network and via a BMSL (which may correspond to, for example, BMSL 275). This data may be, for example, data that represents the beating of a human heart (e.g., as graphical and/or numerical data).

The health monitoring application may analyze the received data, and may determine that an event has occurred. For example, the health monitoring application may determine that a measured heartbeat is above a high threshold, is below a low threshold, or that another event has occurred. Based on making this determination, and as shown in FIG. 5B, the health monitoring application may send a communication to the BMSL.

For example, assume that the health monitoring application has determined that a measured heartbeat has exceeded a threshold level. In this situation, the health monitoring application may output a notification of this event. In some implementations, this notification may include a request to notify a physician and/or family members of a person whose heartbeat is being measured. Alternatively, in some implementations, this notification may not include a request to notify a physician or family members. In some such implementations, policy information (e.g., as stored by an MPRF associated with the BMSL) may indicate that the physician and family members should be notified when a notification of a heartbeat event is received from the health monitoring application.

The BMSL may identify contact information for the physician and the family members. For example, an MPRF associated with the BMSL may store information regarding a device (e.g., a telephone number of a beeper) associated with the physician, and may also store information regarding one or more devices (e.g., telephone numbers of telephones, such as landline or cellular telephones) associated with the family members. The BMSL may also identify one or more applications, by which the physician and the family member may be contacted.

For example, the BMSL may identify a VoIP application (e.g., a non-M2M application), which may be used to dial the beeper associated with the physician. The BMSL may also identify a conferencing application, which may be used to simultaneously call multiple telephones (e.g., multiple telephones associated with multiple family members).

Figure 6:
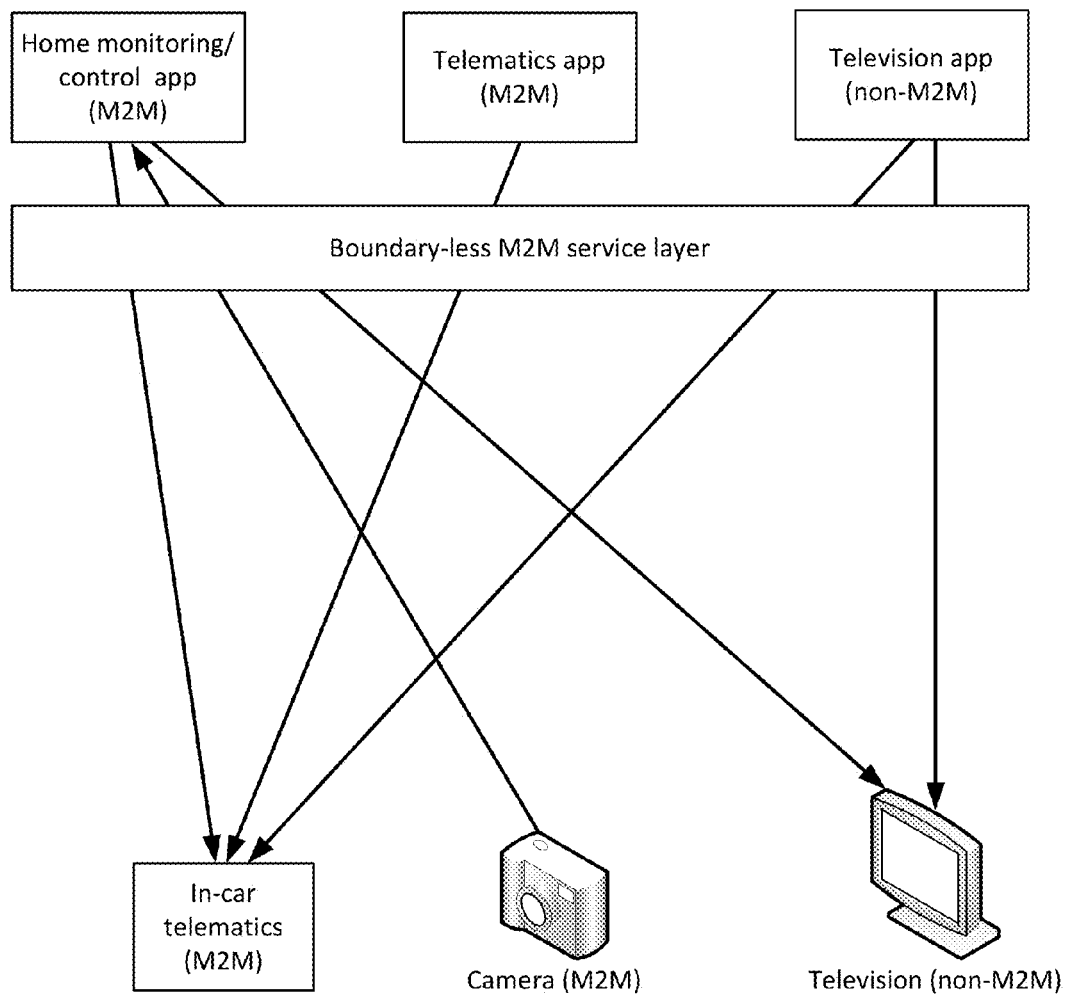
FIG. 6 illustrates an example of a unified service layer and an open device ecosystem.

FIG. 6 illustrates an example of a unified service layer and an open device ecosystem. Using systems and techniques, according to some implementations described above, an ecosystem of devices (e.g., wired and/or wireless devices that are M2M devices or are non-M2M devices) may interact in an open manner. For example, a M2M camera may stream home surveillance video data to a M2M home monitoring and control application. The home monitoring application may provide the streaming home surveillance data to a M2M device, such as a M2M telematics device in a vehicle. Additionally, a non-M2M television application (e.g., an IP television ("IPTV") application that outputs television programs) may provide television data to the in-vehicle telematics device.

In some implementations, the M2M telematics device may be associated with a video output device, such as an in-vehicle video monitor. Via this video monitor, the M2M telematics device may output video pertaining to telematics measured by the telematics device, streaming home surveillance video, and/or television programs. In this sense, the BMSL may serve as a unifying service layer, and may enable the in-vehicle telematics device to deliver multiple types of content from M2M or non-M2M application domains.

Figure 7:
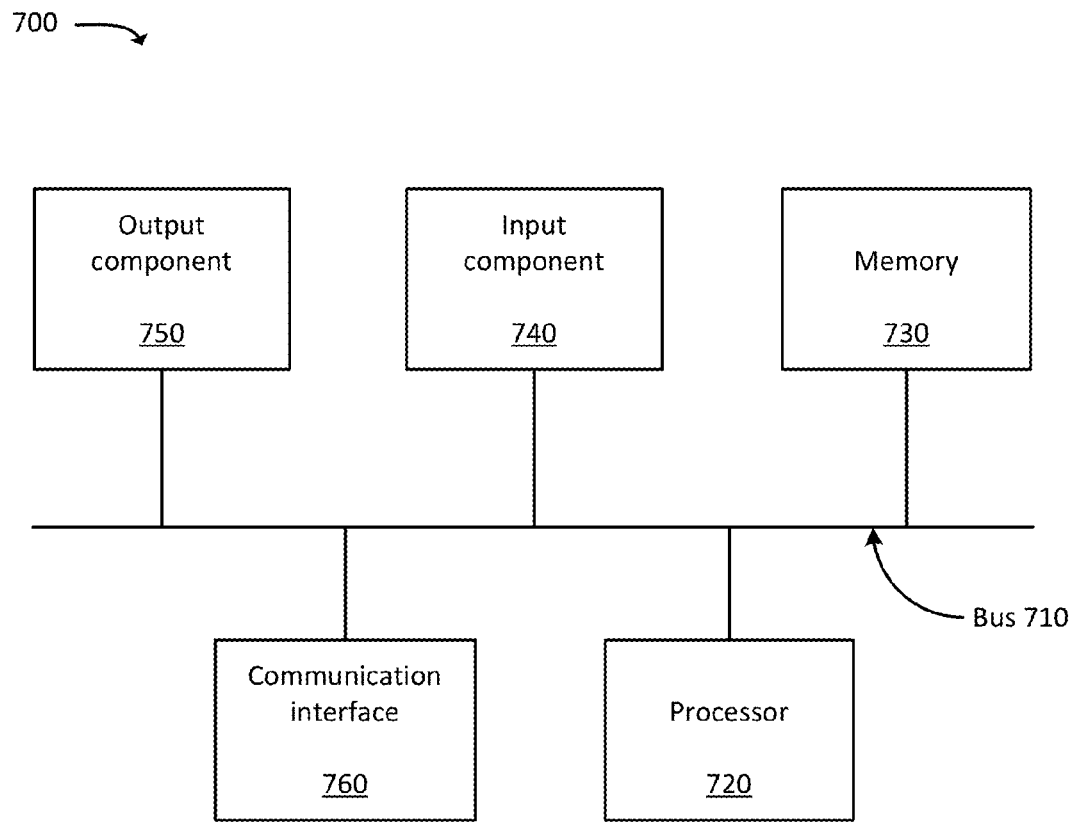
FIG. 7 illustrates example components of one or more devices shown in FIGS. 2A-2D.

FIG. 7 is a diagram of example components of device 700. One or more of the devices illustrated in FIGS. 2A-2D may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A system, comprising:
a boundary-less machine-to-machine ("M2M") service layer, the boundary-less M2M service layer comprising:
a M2M Policy and Rules Function ("MPRF") device, the MPRF device storing a plurality of rules, the plurality of rules including:
a first set of rules that indicate an association between a first application and a second application, the first application being a M2M application that receives and processes communications from one or more M2M devices, and
a second set of rules that define a manner in which to process communications that invoke functions of a particular application programming interface ("API") associated with the first and second applications; and
an application broker device, the application broker device being configured to:
receive a communication from the first application, the communication invoking a particular function associated with the API,
determine, based on the first and second sets of rules, that the communication is to be provided to the second application, and
output at least a portion of the received communication to an application server associated with the second application, based on determining that the communication is to be provided to the second application.

2. The system of claim 1, wherein the communication from the first application does not indicate that a recipient of the communication is the second application.

3. The system of claim 2, wherein the communication from the first application includes a request for a service.

4. The system of claim 1, wherein the communication is a first communication, wherein the application broker device is further configured to:
receive a second communication from a M2M device via a core network,
output a third communication, based on the second communication, to the first application, wherein the first communication, received from the first application, is based on the third communication.

5. The system of claim 1, wherein the plurality of rules, stored by the MPRF, further includes:
a third set of rules regarding application interactions,
wherein outputting the at least a portion of the received communication to the second application includes:

forgoing outputting the at least a portion of the received communication to the second application until an occurrence of a condition specified by the third set of rules.

6. The system of claim 1, wherein the first application is associated with a particular application server
wherein the particular application server communicates with the boundary-less M2M service layer via an interface that is based on a M2M application ("mIa") interface, as specified by a European Telecommunications Standards Institute ("ETSI") standard.

7. The system of claim 1, wherein the MPRF device receives at least a portion of the first or second sets of rules from a policy charging and rules function ("PCRF") associated with a core network.

8. The system of claim 7, wherein the MPRF device receives the at least a portion of the first or second sets of rules from the PCRF via an interface that is based on a Rx interface, as specified by a Third Generation Partnership Project ("3GPP") standard.

9. A machine-to-machine ("M2M") service layer device, comprising:
a memory device to store:
a first set of rules that indicate an association between a first application and a second application, the first application being a M2M application that receives and processes communications from one or more M2M devices,
a second set of rules that define a manner in which to process communications that invoke functions of a particular application programming interface ("API") associated with the first and second applications, and
a set of computer-executable instructions; and
one or more processors to execute the computer-executable instructions, to:
receive a communication from the first application, the communication invoking a particular function associated with the API,
determine, based on the first and second sets of rules, that the communication should be provided to the second application, and
output at least a portion of the received communication to the second application, based on determining that the communication should be provided to the second application.

10. The M2M service layer device of claim 9, wherein the communication from the first application does not indicate that a recipient of the communication is the second application.

11. The M2M service layer device of claim 10, wherein the communication from the first application includes a request for a voice call service.

12. The M2M service layer device of claim 9, wherein the second application is an application that does not support M2M protocols.

13. The M2M service layer device of claim 9, wherein the plurality of rules further includes:
a third set of rules regarding application interactions,
wherein when outputting the at least a portion of the received communication to the second application, the one or more processors are to:
forgo outputting the at least a portion of the received communication to the second application until an occurrence of a condition specified by the third set of rules.

14. The M2M service layer device of claim 9, wherein the first application is associated with a particular application server,
wherein the particular application server communicates with the boundary-less M2M service layer device via an interface that is based on a M2M application ("mIa") interface, as specified by a European Telecommunications Standards Institute ("ETSI") standard.

15. The M2M service layer device of claim 9, wherein the M2M service layer device receives at least a portion of the first or second sets of rules from a policy charging and rules function ("PCRF") associated with a particular one of the one or more core networks.

16. The M2M service layer device of claim 15, wherein the M2M service layer device receives the at least a portion of the first or second sets of rules from the PCRF via an interface that is based on a Rx interface, as specified by a Third Generation Partnership Project ("3GPP") standard.

17. A method, comprising:
receiving, by a machine-to-machine ("M2M") service layer device and from a M2M device via a core network, a first communication;
identifying, by the M2M service layer device, a M2M application server associated with the communication;
outputting, by the M2M service layer device, the first communication to the identified M2M application server;
receiving, by the M2M service layer device and from the M2M application server, a second communication, the second communication being based on processing performed by the M2M application server on the first communication, wherein the second communication invokes a function associated with a particular application programming interface ("API");
identifying, by the M2M service layer device and based on a set of rules associated with the API, a non-M2M application server to which the second communication is to be sent; and
outputting, by the M2M service layer device, the second communication to the non-M2M application server based on the set of rules associated with the API.

18. The method of claim 17, wherein the set of rules indicate a mapping of types of communications with application servers.

19. The method of claim 17, wherein the second communication includes a request for a service that is provided by one or more non-M2M applications servers.

20. The method of claim 19, wherein the service includes at least one of:
a voice over Internet Protocol ("VoIP") call,
a video call,
a video conferencing call,
a short messaging service ("SMS") message,
a multimedia messaging service ("MMS") message,
a file transfer,
a web browsing request, or
an e-mail.

* * * * *